May 4, 1965

E. C. DWYER ETAL 3,182,189

INFORMATION HANDLING SYSTEMS

Filed Oct. 18, 1960

INVENTORS
Edd C. Dwyer and
Jacob G. Waugaman.
BY
W. L. Stout
THEIR ATTORNEY

E. C. DWYER ETAL

3,182,189

INFORMATION HANDLING SYSTEMS

Filed Oct. 18, 1960

United States Patent Office 3,182,189
Patented May 4, 1965

3,182,189
INFORMATION HANDLING SYSTEMS
Edd C. Dwyer, Pittsburgh, and Jacob G. Waugaman, Allison Park, Pa., assignors to Westinghouse Air Brake Company, Wilmerding, Pa., a corporation of Pennsylvania
Filed Oct. 18, 1960, Ser. No. 63,326
9 Claims. (Cl. 246—182)

Our invention relates to an information handling system. More particularly our invention relates to apparatus for the storage and transfer of information for use in automatic control systems.

In automatic systems for controlling the movements of objects over a network of routes it has at times been the practice to store parameters or information pertaining to each object in a different one of a plurality of centrally located storage panels and, as each object arrives at preselected locations along its route, to reselect the panel for that object and read out one or more items of information required for control of the object at those locations. For example, in copending application Serial No. 49,379, filed August 12, 1960, by Emil F. Brinker and David P. Fitzsimmons for Automatic Control System for Railway Classification Yards, which is assigned to the assignee of our present application, a system is disclosed for automatically routing cuts of railway cars to selected storage track destinations, while at the same time controlling the speed at which they couple with preceding cars on the storage tracks. In such a system, information representing switch controls for aligning the route for each car cut, and information representing parameters affecting the rolling characteristics of each cut, such as straight track rolling resistance, curved track rolling resistance, and weight of the cut, are stored in a selected one of a plurality of central storage panels until required, as the respective cut reaches selected locations along its route, for control of switches or control of retardation apparatus for reducing the speed of the cut. One of a group of binary numbers or codes is employed to identify each storage panel and such number or code character identifying a panel is transferred, as the car cut having its information stored in that panel progresses over its respective route, through a corresponding circuit network. At the points in this circuit network where one or more items of information pertaining to the cut are required, the binary code character is interpreted, the identified storage panel is reselected, and the information required is read out and transferred to the respective circuit points.

In such automatic control systems, in order to keep the apparatus to a minimum, it is customary to employ a quantity of central storage panels equal in number to the quantity of car cuts that can normally be en route, at any one time, to the storage tracks. However, under unusual conditions such as a succession of exceptionally slow rolling cuts, it is possible that one of the central storage panels may not be available for storing information for one or more additional cuts immediately following said succession of cuts. Such unusual conditions may also prevail where one or more of the storage panels is inoperative. Under such conditions it is desirable, in order to control the speed of said additional cuts as near as possible to their proper speed, to transfer one or more of the aforesaid items of information representing parameters affecting the rolling characteristics, such as the weight of each such cut, to the apparatus for controlling the speeds of the cuts. It is accordingly one object of our invention to provide novel transfer control apparatus for transferring, under such unusual conditions and along with each such additional cut, one or more of the items of information required for control, for that cut, of the speed control apparatus.

Other objects and characteristics features of our invention will become apparent as the description proceeds.

In accomplishing the foregoing objects of our invention, we employ apparatus for translating one or more speed control information items for a cut of cars into one or more binary code characters and for supplying each said code character to the same transfer circuit apparatus nomally employed for transferring the binary codes identifying the storage panels.

We shall describe one form of apparatus embodying our invention and shall then point out the novel features thereof in claims.

We have illustrated an embodiment of our invention which is adapted to be employed in a classification yard of the type disclosed in the above copending application. Only those components of the system disclosed in said copending application which are necessary to make our disclosure complete and to an understanding of our invention have been illustrated, and in one instance the components have been illustrated in block diagram form. However, the correspondence between schematically illustrated components and those shown in detail in the above-mentioned application will be readily apparent to those skilled in the art as the description proceeds.

In the accompanying drawings, FIGS. 1, 2 and 3 when arranged in the manner shown in FIG. 4 comprise a schematic wiring diagram of one embodiment of our invention.

FIG. 4 is a chart showing the manner in which FIGS. 1, 2 and 3 should be arranged in order to show said one embodiment of our invention.

It should be pointed out at this time that a suitable source of current is provided for controlling the apparatus of our invention other than the track circuits, this power source being preferably a battery of proper voltage and capacity. However, for the sake of simplicity the power source is not shown in the drawings, but its positive and negative terminals are identified by reference characters B and N, respectively.

Several of the relays in the drawings are slow-acting relays, that is, either slow to release, or both slow to pick up and release. The contacts of such slow-release relays are shown in the conventional manner by an arrow drawn vertically through the movable portion of each contact with the head of the arrow pointed in the direction the relay contacts are slow-acting. In the case of slow-pickup, slow-release relays, an arrow head is provided on both ends of the vertical line through the movable portions of the relays' contacts.

Figure 1:
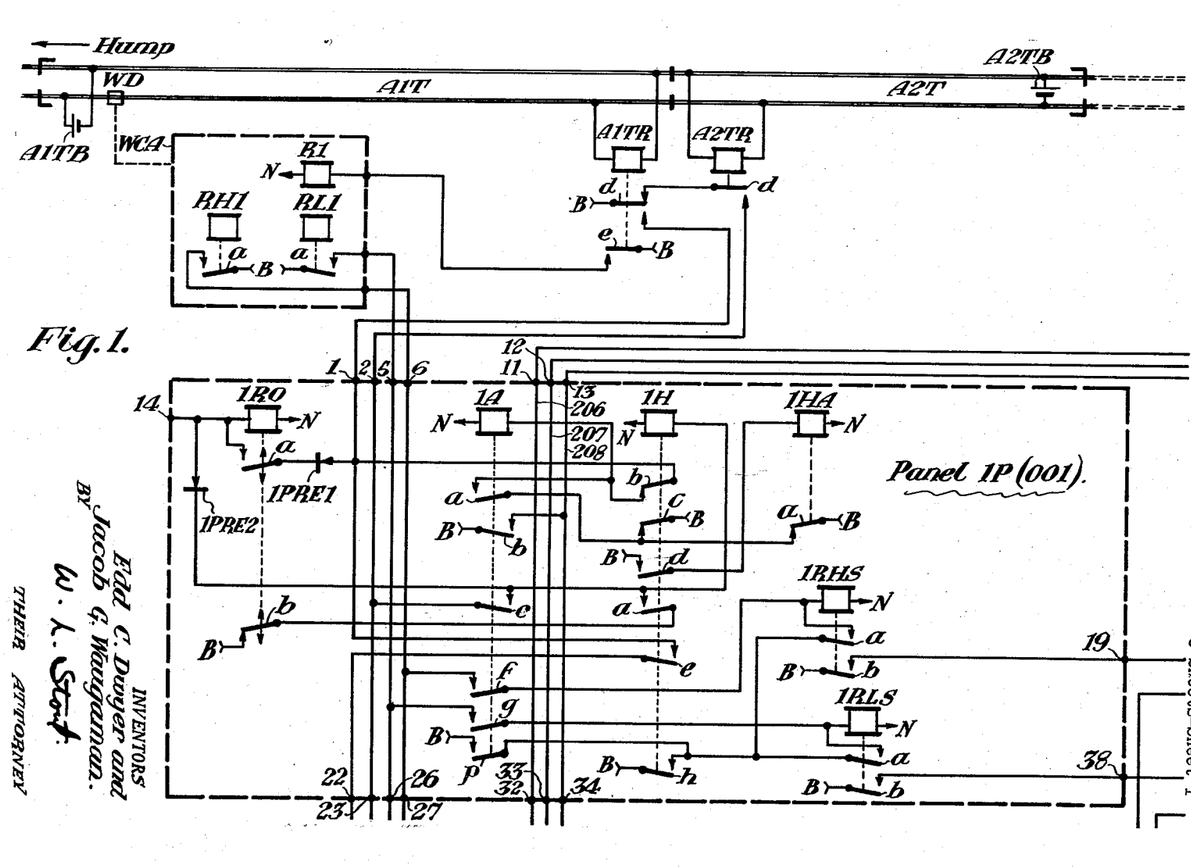

Referring to FIG. 1, we have illustrated a stretch of railway track comprising the entrance end of a common route extending from a hump in a classification yard to a point within the yard. The track stretch includes two adjacent track sections designated from left to right, as shown on the drawing, A1T and A2T, respectively. Each of these track sections is provided with a track circuit including a track battery and a track relay arranged in the manner well known in the art so that each track relay is picked up when its respective track section is unoccupied, and released when the track section is occupied by the wheels and axle of a railway car. The track battery and relay for section A1T are designated A1TB and A1TR, respectively, and these components for section A2T are designated A2TB and A2TR, respectively.

There is shown in one of the track rails adjacent the entrance end of track section A1T in FIG. 1 a car weight determining means or device indicated by the reference character WD. This device is indicated as connected to weight classification apparatus designated WCA, by a dotted line extending from the device to a dotted line block representing such apparatus and enclosing three relays designated R1, RH1 and RL1. The weight determining device and the weight classification apparatus are shown in such manner because they form no part of our present invention but, for purposes of this description, are assumed to be similar to apparatus shown in FIG. 1B of the above-mentioned copending application and more fully disclosed in Letters Patent of the United States No. 2,819,682, issued January 14, 1958 to Edward C. Falkowski for Car Retarder Speed Control Apparatus. In FIG. 1a of that patent are shown relays R1, RH1 and RL1 as indicated in the dotted line block in FIG. 1 of the drawings of our apparatus; and, for purposes of this description, it is sufficient to point out that relay RL1 only is energized when a railway car traversing track section A1T is classified by the weight determing device WD as a light weight car, relay RH1 only is energized when the the car is classified as a heavy weight car, and both relays are energized when the car is of a medium weight classification. In the operation of our apparatus relay R1 is energized, so long as track section A1T is occupied, by a circuit extending from terminal B of the battery over back contact e of track relay A1TR and through the winding of relay R1 to terminal N of the battery. Relay R1 operates, in a manner similar to that shown in FIG. 1a of the said Falkowski patent, to retain relays RH1 and RL1 energized, when once energized, so long as track section A1T is occupied. Reference is made to the cited Falkowski patent for a complete understanding of the manner in which the weight determining arrangement shown in FIG. 1 of the drawings of our apparatus operates. The circuits controlled by relays RL1 and RH1 will be discussed in detail hereinafter.

Figure 2:
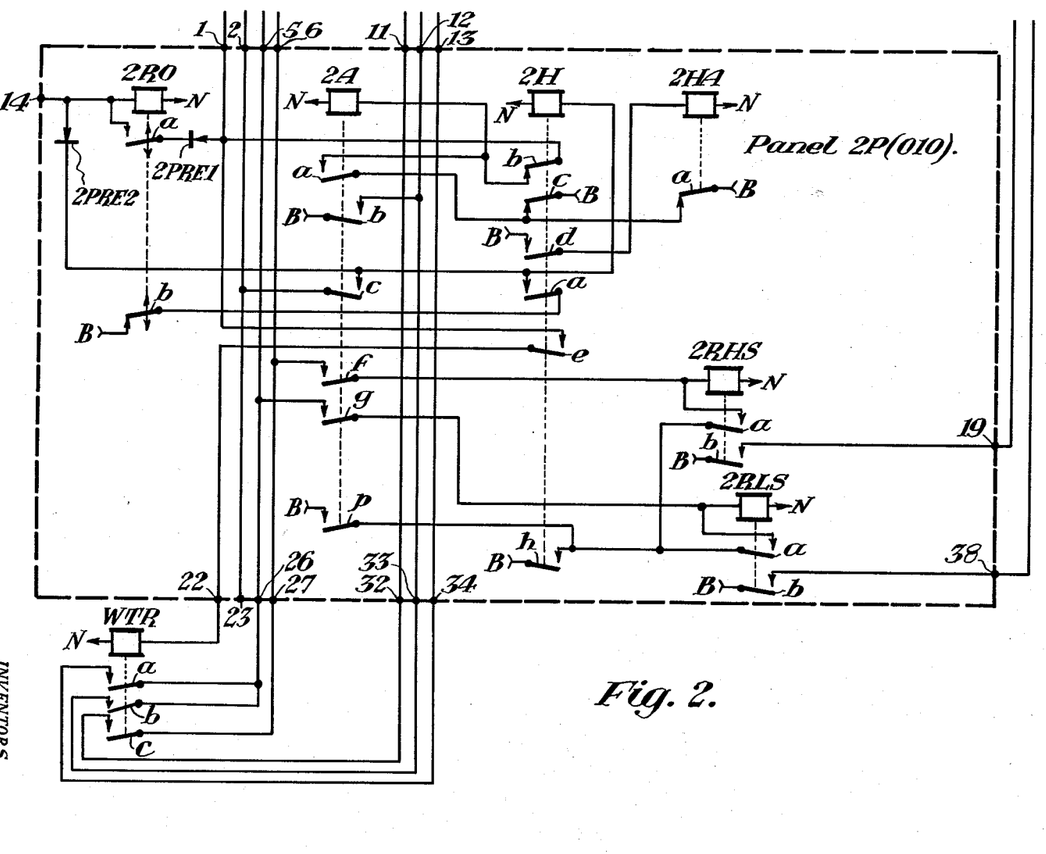

Referring now to FIGS. 1 and 2, there is shown a series or plurality of two storage panels designated 1P and 2P. These panels correspond to the storage panels 1P and 2P shown in FIGS. 2A, 3A and 4A of the said copending application of Brinker and Fitzsimmons and reference to said application will readily disclose the similarity between storage panel 1P shown therein and that of the storage panel 1P shown in FIG. 1 of our present application. However, only those components of the storage panels necessary to a description of our invention are shown in our present application, and only two such panels are shown in order to greatly simplify the description. It should be pointed out that for the purposes of the present description it is assumed that normally only two cuts of cars will be en route at any one time between the hump and the storage track destinations of the cuts and, therefore, two storage panels will suffice under any but unusual conditions.

In the said copending application a group of three-bit or three-digit binary numbers or codes are employed for identification of seven storage panels, but it is apparent that a group of four-bit or digit binary numbers could be employed for said identification if desired and the unused or unassigned numbers could be employed for other purposes. In our present application we have shown, for purposes of simplification, only two storage panels employing a group of three-bit or three-digit binary codes for identification of the panels, and employ several of the remaining code characters of the group for other purposes, as will be readily apparent later in the description.

Referring further to FIGS. 1 and 2, one of the panels 1P or 2P is selected by each cut of cars entering the yard over the hump and the selected panel is employed to store information for the cut until required by weight responsive apparatus for making computations pertaining to the cut or for controlling apparatus in the yard for retarding the cut. The details of such apparatus form no part of our invention and, therefore, are not shown in the drawings. Each storage panel is identified by a distinct binary code character which is transferred along with or ahead of the cut for which a panel is selected so that the proper panel may, at any time, be reselected and that the information stored in the panel may be read out when required.

Since the two storage panels 1P and 2P are similar in apparatus arrangement, except as pointed out below, it is believed sufficient for purpose of simplicity to describe only storage panel 1P in detail. The description of the details of panel 1P will apply equally well to panel 2P as will readily be apparent as the description proceeds.

The panels 1P and 2P are identified respectively by binary numbers or code characters 001 and 010, and each respective code character is indicated in parentheses following the panel designation of each panel shown on the drawings.

There is shown on storage panel 1P a plurality of terminals designated 1, 2, 5, 6, 11, 12 and 13. Terminals 1 and 2 comprise panel selection terminals which are connected internally in the panel to the windings of selection control relays 1A and 1H, respectively. The pickup circuit for relay 1A may be traced from terminal 1 over back contact b of relay 1H and through the winding of relay 1A to terminal N of the battery. Relay 1A is thus energized when current is supplied from battery terminal B to terminal 1 of panel 1P, in a manner to be hereinafter described, and when relay 1H is in its released position. Relay 1A is provided with a stick circuit which may be traced from battery terminal B over back contact c of relay 1H in multiple with a back contact a of relay 1HA, to be described, and thence over front contact a of relay 1A, and through the winding of relay 1A to battery terminal N. Relay 1A is thus maintained in its picked-up position, so long as either relay 1H or 1HA remains released.

The pickup circuit for relay 1H extends from terminal 2 on storage panel 1P, over front contact c of relay 1A and through the winding of relay 1H to battery terminal N. Relay 1H is thus energized when current is supplied from battery terminal B to terminal 2 of panel 1P, in a manner to be hereinafter described, and relay 1A is in its picked-up position. Relay 1H is provided with a stick circuit which extends from battery terminal B over a back contact b of a relay 1RO, to be described, and thence over front contact a of relay 1H, and through the winding of relay 1H to battery terminal N. Relay 1H is thus maintained in its picked-up position, when once controlled to that position, so long as relay 1RO remains released.

Relay 1HA, previously mentioned, is an auxiliary control relay which repeats the picked-up position of relay 1H. The pickup circuit for relay 1HA extends from battery terminal B over front contact d of relay 1H and through the winding of relay 1HA to battery terminal N. Relay 1HA is thus energized whenever relay 1H is energized. Relay 1HA is employed to insure that relay 1A will maintain its front contact c closed for a sufficient period of time for relay 1H to close its front contact a and complete its stick circuit. Back contact a of relay 1HA in the stick circuit for relay 1A is, therefore, employed to maintain relay 1A picked up until relay 1H closes its front contact d thereby also insuring the closure of front contact a of relay 1H.

Relay 1RO, previously mentioned, is the cancellation relay for panel 1P. This relay has a pickup circuit extending from an additional terminal 14 on panel 1P through the winding of relay 1RO to battery terminal N. Relay 1RO is thus energized whenever energy from battery terminal B is connected to terminal 14. However, the circuits for supplying said energy to terminal 14 form no part of our present invention and no detailed description of such circuits is necessary for an understanding of our invention. Relay 1RO is provided with a stick circuit which extends from terminal 1 on panel 1P, through a rectifier designated 1PRE1, employed to prevent sneak circuits, over front contact a of relay 1RO and through the winding of relay 1RO to battery terminal N. Relay 1RO is thus maintained picked-up when once picked up so long as energy from battery terminal B is being supplied to said terminal 1.

Relay 1H has a second pickup circuit which extends from terminal 14 on panel 1P through a rectifier designated 1PRE2, employed to prevent sneak circuits, and through the winding of relay 1H to battery terminal N. This circuit insures that relay 1H is maintained picked up, after the opening of back contact b of relay 1RO in the stick circuit for relay 1H, so long as energy is supplied to the winding of relay 1RO. Upon energy being removed from the winding of relay 1RO, relay 1H will release before relay 1RO due to the slow release feature of relay 1RO. Thus, it is insured that relay 1RO cannot close its back contact b and again complete the stick circuit for relay 1H in the event relay 1H is slightly sluggish in releasing.

By the above circuit description it is apparent that relay 1A may be energized by supplying energy from terminal B of the battery to terminal 1 of panel 1P, providing relay 1H is not energized. If energized, relay 1H indicates that panel 1P is not available for storages because it already contains storages. When relay 1A is energized relay 1H may then be energized by supplying energy to terminal 2 of panel 1P. When relay 1H and its repeater relay 1HA are energized they are retained energized until energy is supplied to and removed from terminal 14 of the panel thereby momentarily energizing cancellation relay 1RO. The continued energization of relay 1H prevents relay 1A from again becoming energized so long as relay 1H is energized.

A conductor 206 extends between terminal 11 on panel 1P and an additional terminal 32 on panel 1P. Another conductor 207 extends between terminal 12 on panel 1P and an additional terminal 33 on panel 1P. A third conductor designated 208 extends between terminal 13 on panel 1P and another additional terminal 34 on panel 1P. The energized or deenergized conditions of these conductors establishes the three-bit binary identifications previously discussed. That is, the deenergized or energized condition of conductor 206 indicates zero or one, respectively, for the first digit of the three-digit binary code character. Similarly, the deenergized or energized condition of conductor 207 indicates zero or one, respectively, for the second digit and the deenergized or energized condition of conductor 208 indicates zero or one, respectively, for the third digit of the three-digit binary code character. Therefore, to establish the binary identification 001 assigned to panel 1P, only conductor 208 would be energized. This is accomplished over front contact b of relay 1A which when closed connects battery terminal B to conductor 208, conductors 206 and 207 remaining deenergized at this time.

Terminal 1 of panel 1P is connected to an additional terminal 22 on panel 1P (FIG. 1) when relay 1H is energized. This circuit may be traced from terminal 1 over front contact e of relay 1H and thence to said terminal 22. When this circuit is closed by the energization of relay 1H, energy supplied to terminal 1 of panel 1P is supplied to terminal 22 and thence to terminal 1 of panel 2P as shown in FIG. 2. This energy operates in panel 2P to energize relay 2A over circuits similar to those traced for relay 1A. Relay 1A in panel 1P cannot be energized at this time as its previously described pickup circuit is open at back contact b of relay 1H. Terminal 1 of storage panel 2P may be connected to terminal 22 of that panel by the energization of relay 2H in the panel. Thus, energy supplied to terminal 1 of panel 1P may be relayed by the energized position of relay 1H to terminal 1 of panel 2P and thence by the energized position of relay 2H to terminal 22 of panel 2P. Each time the A relay in a selected panel is energized, contacts of that relay energize the proper ones of the conductors 206, 207 and 208 to establish the binary code character identifying the selected panel, these conductors extending between terminals 11, 12 and 13 of panel 1P to terminals 32, 33 and 34, respectively, on that panel; and between terminals 32, 33 and 34 of panel 1P to terminals 11, 12 and 13, respectively, of panel 2P, and thence to terminals 32, 33 and 34, respectively, of panel 2P.

Terminal 2 of panel 1P is connected to an additional terminal 23 on that panel and thence to terminal 2 of panel 2P. Terminal 2 of panel 2P connects to terminal 23 of that panel. Thus, when energy is supplied from terminal B of the battery to terminal 2 of panel 1P, this energy flows through the panels to the one having its A relay energized and energizes the H relay of that panel. The energization of the H relay, and consequently the HA relay, releases the A relay of the respective panel, as heretofore pointed out.

The terminals 5 and 6 on panel 1P are internally directly connected in the panel to additional terminals 26 and 27, respectively, on the panel, which in turn are connected to terminals 5 and 6 on panel 2P. Terminals 5 and 6 of panel 2P connect to terminals 26 and 27, respectively, of that panel, in a manner identical to panel 1P. It should also be noted that panel 2P is provided with a cancellation terminal 14 which is connected internally to cancellation relay 2RO similar to relay 1RO in panel 1P. The application and removal of energy from battery terminal B to terminal 14 of panel 2P serves to cancel the storages in that panel in a manner similar to that outlined for panel 1P.

Referring again to panel 1P, terminals 5 and 6 each connect through a front contact of relay 1A to a storage relay 1RLS or 1RHS provided in the panel for storing information supplied to each said terminal. Relays 1RLS and 1RHS are used to store weight classification information for a cut of cars. Relay 1RLS is provided with a pickup circuit which extends from terminal 5 on panel 1P over front contact g of relay 1A, and through the winding of relay 1RLS to battery terminal N. Relay 1RLS is thus picked up when energy from battery terminal B is supplied, in a manner to be hereinafter described, to terminal 5 on panel 1P and relay 1A is energized. Relay 1RLS is provided with a stick circuit which extends from battery terminal B over front contact h of relay 1H, front contact a of relay 1RLS, and through the winding of relay 1RLS to battery terminal N. Relay 1RLS is thus maintained picked up, when once picked up, so long as relay 1H is energized.

Relay 1RHS is provided with a pickup circuit extending from terminal 6 of panel 1P over front contact f of relay 1A, and through the winding of relay 1RHS to battery terminal N. Relay 1RHS is thus picked up when energy from battery terminal B is supplied, in a manner to be hereinafter described, to terminal 6 on panel 1P and relay 1A is energized. Relay 1RHS has a stick circuit which extends from battery terminal B over front contact h of relay 1H, front contact a of relay 1RHS, and through the winding of relay 1RHS to battery terminal N. Relay 1RHS is thus maintained picked up, when once picked up, so long as relay 1H is energized.

Relays 1RHS and 1RLS are provided with additional stick circuits for each relay, each such circuit extending from terminal B of the battery over front contact p of relay 1A, and thence over the front contact a of each relay and through the respective relay winding to battery terminal N. Each of these relays is therefore maintained energized, when once energized, so long as relay 1A remains energized, these stick circuits insuring that the energized relays will remain energized until relay 1H becomes picked up, as hereinafter described, to complete the stick circuits over front contact h of relay 1H.

It is readily apparent that storage panel 2P is also provided with storage relays 2RLS and 2RHS having pickup and stick circuits similar to those described for relays 1RLS and 1RHS associated with panel 1P. The pickup circuits for such relays in panel 2P are connected to terminals 5 and 6, respectively, in a manner similar to the corresponding relays shown and described for panel 1P. It is believed that this arrangement will be readily understood and, therefore, the details of such circuits in panel 2P need not be described for an understanding of the arrangement.

Referring now to FIG. 1, it is believed that it will be expedient to describe the manner in which one of the storage panels 1P or 2P is selected for a cut of cars entering track section A1T, and the manner in which the weight classification pertaining to the cut of cars is supplied to the storage panel through control of the track relays for sections A1T and A2T.

When the car cut enters track section A1T, the release of track relay A1TR energizes relay R1 over back contact e of relay A1TR, and relay R1 will complete stick circuits for relays RH1 and RL1 which are energized in accordance with the weight classification for the cut of cars as the wheels of the cut pass over weighing device WD. Assuming the weight classification for the cut to be determined as medium, both relays RH1 and RL1 will be energized and will supply energy from terminal B of the battery over front contacts a of relays RL1 and RH1 to terminals 5 and 6, respectively, of panel 1P.

The release of track relay A1TR also connects terminal B of the battery over the back point of contact d of that relay to terminal 1 of panel 1P. This circuit is the panel selection circuit which operates to energize the A relay in panel 1P if that panel contains no storages, or in panel 2P if panel 1P contains storages. For example, if panel 1P contains storages, relay 1H will be energized and the energy supplied to terminal 1 of panel 1P will be conducted over front contact e of relay 1H to terminal 22 of panel 1P and thence to terminal 1 of panel 2P. The open back contact b of relay 1H prevents said energy from being supplied to the winding of relay 1A. If panel 2P also contains storages, the energy supplied to terminal 1 of that panel is transferred to terminal 22 of panel 2P over closed front contact e of relay 2H. When the energy is supplied to terminal 1 of a panel void of storages it will be conducted over back contact b of the H relay in that panel to the winding of the A relay in the panel which will thus be energized to select that panel for storing the parameters pertaining to the cut.

For purposes of simplicity in this portion of our description, it will be assumed that panel 1P is void of storages and, therefore, the energy supplied to terminal 1 of panel 1P is supplied to the winding of relay 1A over the previously described pickup circuit for that relay and relay 1A becomes energized, closing its contacts a, b, c, f, g and p.

Assuming the cut has a medium weight classification, the energy supplied to terminals 5 and 6 of panel 1P will flow over front contacts g and f, respectively, of relay 1A to the windings of relays 1RLS and 1RHS, respectively. These relays will thus become energized, and will close their stick circuits, including front contact p of relay 1A, and store the medium weight classification for the cut.

It is to be noted that, if panel 1P already contains storages and is not selected for this cut, panel 2P, if it contains no storages, will be selected and relay 2A becomes energized. The energies supplied to terminals 5 and 6 of panel 1P will then flow through panel 1P to panel 2P and thence over front contacts g and f, respectively, of relay 2A to the windings of storage relays 2RLS and 2RHS, respectively.

When the cut of cars vacates track section A1T, and relay A1TR again picks up, an energizing circuit for relay 1H is closed. This circuit for relay 1H extends from terminal B of the battery over the front point of contact d of track relay A1TR, back contact d of track relay A2TR, terminal 2 of panel 1P, through the previously described pickup circuit for relay 1H to the winding of that relay and through the winding to battery terminal N. Relay 1H picks up and closes its front contact h, establishing the previously described second stick circuits for relays 1RHS and 1RLS. Thus, the storage relays in panel 1P will be maintained energized so long as relay 1H remains energized.

The pickup of relay 1H closes the pickup circuit for relay 1HA; and, when this latter relay opens its back contact a, relay 1A in panel 1P will release. The release of relay 1A opens, at its front contact p, the previously described first stick circuit for the storage relays, but these relays are now maintained picked up over front contact h of relay 1H. The release of relay 1A also opens, at its contacts f and g, the energizing circuits for the storage relays, and the storages in these relays cannot thereafter be disturbed or changed by storages for another cut of cars entering track section A1T and for which storage panel 2P will be selected. The vacating of track section A2T by the first cut and the consequential picking up of track relay A2TR will open at back contact d of relay A2TR the circuit to terminal 2 of panel 1P. The circuits and apparatus, with the exception of the storages in panel 1P, are now in the condition existing before the entry of the first cut into track section A1T, providing a second cut has not entered into that track section. If a second cut has already entered track section A1T when the first cut vacates section A2T, the circuits and apparatus will operate in a manner identical to that described for the first cut except, as pointed out, the storages for the second cut will be supplied to storage panel 2P, assuming that panel to be vacant at this time. It should be pointed out that car cuts entering the yard should be so spaced that no two cuts can occupy track section A1T or A2T at the same time. If such spacing is not maintained and two cuts do occupy the same track section at the same time, the identity of the second cut will be lost, that is, the apparatus may operate as if the second cut is part of the first cut, or operate improperly in other respects. The personnel controlling the humping operations in such a yard are, therefore, advised as to the maximum humping rate permissible for proper operation of the apparatus in the yard.

Each of the panels 1P and 2P is provided with readout terminals designated 19 and 38 which correspond to the identical terminals 19 and 38 shown on panel 1P in FIG. 3A of said copending application of Brinker and Fitzsimmons. Circuits for supplying energy to said readout terminals in panel 1P extend from terminal B of the battery over front contacts b of relays 1RHS and 1RLS to terminals 19 and 38, respectively. Similarly, circuits for supplying energy to said readout terminals in panel 2P extend from battery terminal B over front contacts b of relays 2RHS and 2RLS to terminals 19 and 38, respectively. The purpose of these readout circuits and terminals is discussed hereinafter.

Referring further to FIG. 2, an additional relay designated WTR is shown having one terminal of its control winding connected to terminal 22 of panel 2P and the other terminal of said winding connected to terminal N of the battery. This relay is termed a weight transfer relay and is energized when energy is supplied to terminal 1 of panel 1P and both panels 1P and 2P already contain storages and have their H relays energized. The circuit for energizing relay WTR at this time extends from terminal 1 of panel 1P, over front contact e of relay 1H (FIG. 1) to terminal 22 of panel 1P, and thence to terminal 1 of panel 2P (FIG. 2), front contact e of relay 2H, terminal 22 of panel 2P and through the winding of relay WTR to battery terminal N.

Relay WTR controls circuits from terminals 26 and 27 of panel 2P to terminals 32, 33 and 34 of panel 2P. The first of these circuits extends from terminal 27 of panel 2P over front contact c of relay WTR to terminal 32 of panel 2P. From terminal 32 of panel 2P the circuit further extends to terminal 11 of that panel, terminal 32 of panel 1P, to the previously mentioned conductor 206 and terminal 11 of panel 1P. As will become more apparent hereinafter in this description, this circuit serves, by applying energy to conductor 206 only, to establish the binary code character 100 for a heavy weight classification for a cut of cars.

The second of the above-mentioned circuits extends from terminal 26 of panel 2P over front contact *b* of relay WTR to terminal 33 of panel 2P. A third circuit is traced from terminal 26 of panel 2P over front contact *a* of relay WTR to terminal 34 of panel 2P. From terminals 33 and 34 of panel 2P the circuits extend to terminals 12 and 13, respectively, of that panel, terminals 33 and 34, respectively, of panel 1P to the previously mentioned conductors 207 and 208, respectively, and terminals 12 and 13, respectively, of panel 1P. As will also become more apparent hereinafter these circuits serve, by applying energy to conductors 207 and 208, to establish the binary code character 011 for a light weight classification for a cut of cars. It is readily apparent that the energization of all three conductors 206, 207 and 208 establishes the binary code character 111, which, as will be hereinafter discussed, represents a medium weight classification for a car cut.

Figures 3, 4:
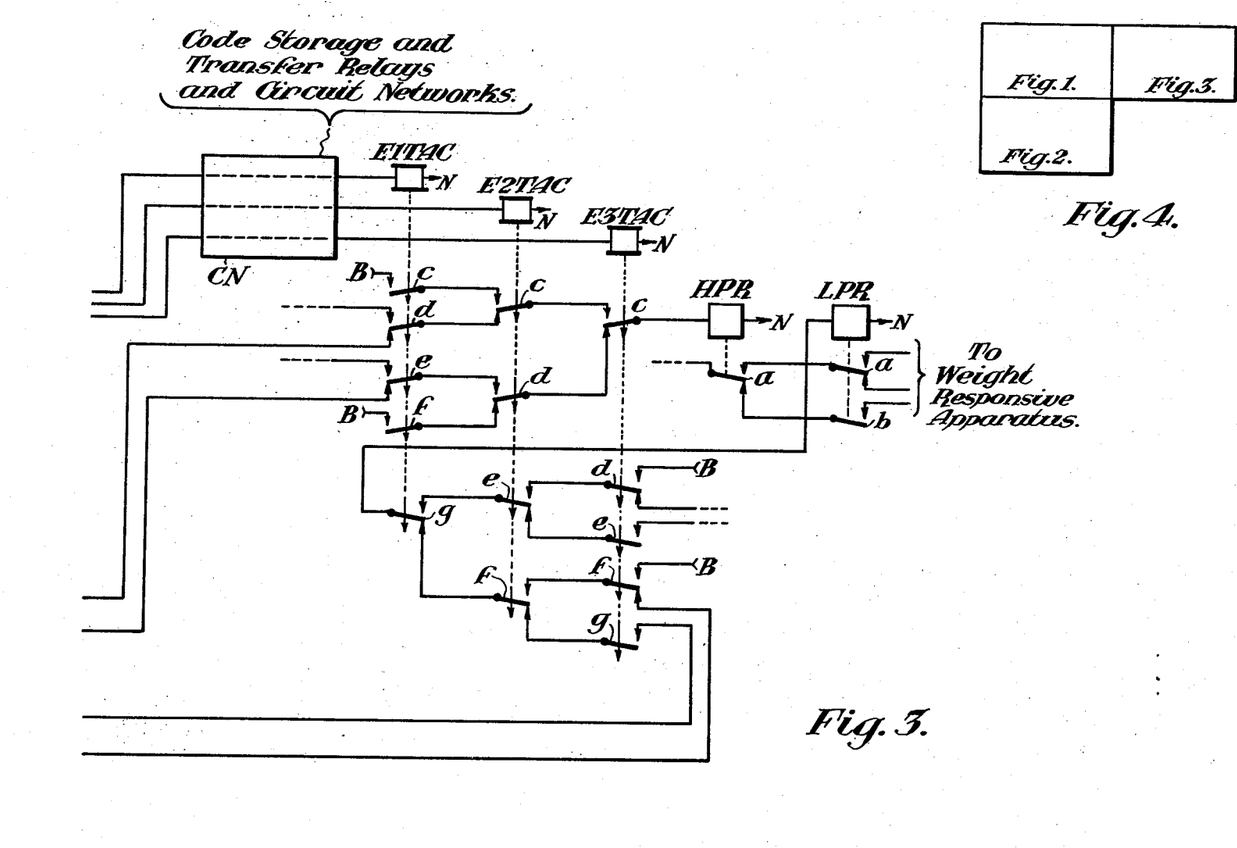

Referring now to FIGS. 1 and 3, a circuit extends from each of the terminals 11, 12 and 13 of panel 1P to a block diagram representing code storage and transfer circuit networks designated CN, and thence to one terminal of the control windings of relays E1TAC, E2TAC and E3TAC, respectively. The other terminals of the control windings of the relays are each connected to terminal N of the battery. The circuit networks CN form no part of our invention and are shown in block diagram form for purposes of simplification of this description. These circuit networks correspond to the circuit networks shown in FIGS. 5C and 5D of the previously mentioned copending application of Brinker and Fitzsimmons and reference is made to said application for a complete understanding of the manner in which the circuit networks operate. It should also be pointed out that relays E1TAC, E2TAC and E3TAC and the contacts thereof shown in FIG. 3 of the present application correspond to the identical relays and contacts shown in FIGS. 5D and 6D of said copending application. Also relays HPR and LPR, shown in FIG. 3 and to be hereinafter discussed, correspond to relays MR1HPR and MR1LPR, respectively, shown in FIG. 2D of the copending application.

The bank of TAC relays and relays HPR and LPR represent a point in the transfer circuit network where information regarding the rolling characteristics of the cars is needed to control apparatus which regulates the progress of the cuts of cars along their routes, e.g., a set of car retarders for speed control. It is believed sufficient to point out, for the purposes of this description, that the circuit networks CN operate to transfer each binary code character, established as previously described, to the relays E1TAC, E2TAC and E3TAC as the cut of cars associated with the character progresses towards its destination in the yard. When each cut of cars arrives at a location in the yard where its weight classification is required in the associated network, the TAC relays will be operated in accordance with the binary code character identifying the storage panel for the cut and contacts of those relays will operate to connect the HPR and LPR relays to the readout terminals 19 and 38, respectively, of the identified panel. If no storage panel was available for the cut when it entered the yard, as previously mentioned, relays HPR and LPR will be controlled directly by contacts of the TAC relays to reflect, in accordance with the binary code character assigned to the weight classification of the cut, such weight classification. This operation will be pointed out in more detail hereinafter.

Assuming that panels 1P and 2P contain storages for first and second cuts of cars, respectively, and that the first cut is of a heavy weight classification and the second cut is of a light weight classification, relay 1RHS in panel 1P is energized and applies energy from terminal B of the battery to terminal 19 of panel 1P, and relay 2RLS in panel 2P is energized and applies energy from terminal B of the battery to terminal 38 of panel 2P. As the first cut progresses through the yard towards the location where its weight classification is required, the circuit networks CN transfer along with the cut the binary code character 001 identifying panel 1P and established during the period relay 1A was picked up to close its front contact *b*. When the cut arrives at said location, relay E3TAC only is energized to reflect the binary character 001. Relays E1TAC and E2TAC remain released at this time since no energy was supplied to terminals 11 and 12 of panel 1P and consequently to the conductors from those terminals to the circuit networks. Relay E3TAC becoming picked up closes, at the front point of its contact *c*, an energizing circuit for relay HPR. This circuit may be traced from terminal B of the battery over front contact *b* of relay 1RHS (FIG. 1), terminal 19 of panel 1P, the back point of contact *d* of relay E1TAC, the back point of contact *c* of relay E2TAC, the front point of contact *c* of relay E3TAC and through the winding of relay HPR to terminal N of the battery. Relay HPR thus becomes picked up, reflecting a heavy weight classification and controlling a circuit, including the front point of contact *a* of relay HPR and the back point of contact *a* of relay LPR, to apparatus designated weight responsive apparatus.

Similarly, when the second cut progresses through the yard towards the point where its weight classification is required, the circuit networks CN transfer the binary code character 010 identifying panel 2P and, when the cut arrives at said location, relay E2TAC only is energized to reflect the binary code 010. Relays E1TAC and E3TAC remain released at this time since no energy was originally supplied to terminals 11 and 13 of panel 2P and consequently to the conductors from those terminals to the circuit networks. Relay E2TAC becoming picked up closes at the front point of its contact *f* an energizing circuit for relay LPR. This circuit may be traced from terminal B of the battery over front contact *b* of relay 2RLS (FIG. 2), terminal 38 of panel 2P, the back point of contact *f* of relay E3TAC, the front point of contact *f* of relay E2TAC, the back point of contact *g* of relay E1TAC, and through the winding of relay LPR to battery terminal N. Relay LPR thus becomes picked up, reflecting a light weight classification and controlling a circuit, including the back point of contact *a* of relay HPR and front contact *b* of relay LPR, to the weight responsive apparatus.

The weight responsive apparatus actuated by contact *a* of relay HPR and contacts *a* and *b* of relay LPR form no part of our present invention and, therefore, no details thereof are shown in the drawings. However, by reference to the copending application of Brinker and Fitzsimmons the operation of such apparatus controlled by similar contacts of the corresponding relays MR1HPR and MR1LPR will be readily apparent (FIGS. 1D and 2D of said copending application).

It should be pointed out that when relay E3TAC only is energized, as described above, to reflect the binary code character 001 for storage panel 1P for the first cut, a circuit from terminal 38 of that panel to the control winding of relay LPR is also closed but, the cut having a heavy weight classification, relay 1RLS is deenergized at this time and no energy is supplied to terminal 38 of panel 1P. This circuit from said terminal 38, at this time, extends over front contact *g* of relay E3TAC, the back point of contact *f* of relay E2TAC, the back point of contact *g* of relay E1TAC to the winding of relay LPR. Similarly, when relay E2TAC only is energized, as described above, to reflect the binary code character 010 for storage panel 2P for the second cut, a circuit from terminal 19 of that panel to the control winding of relay HPR is also closed but, the cut having a light weight classification, relay 2RHS is deenergized at this time and no energy is supplied to terminal 19 of panel 2P. This circuit from said terminal 19, at this time, extends over the back point of contact *e* of relay E1TAC, the front point of contact *d* of relay E2TAC, the back point of contact *c* of relay E3TAC to the winding of relay HPR.

If the first cut had been classified as a medium weight cut, both the 1RHS and 1RLS relays in the panel 1P would have been energized and the above-described circuit from terminal 38 of panel 1P would have been energized to pick up relay LPR along with relay HPR and thereby reflect a medium weight classification for the first cut. Similarly, if the second cut had been classified as a medium weight cut, both the 2RHS and 2RLS relays in panel 2P would have been energized and the above-described circuit from terminal 19 of panel 2P would have been energized to pick up relay HPR along with relay LPR and thereby reflect a medium weight classification for the second cut. The picked-up condition of both relays HPR and LPR controls a circuit, including in series the front points of contacts *a* of relays LPR and HPR, to the weight responsive apparatus to reflect a medium weight classification in that apparatus.

It will now be assumed that an unusual condition such as heretofore mentioned occurs, that is, both panels 1P and 2P contain storages for first and second cuts of cars and a third cut enters the yard and shunts the track circuit of track section A1T. Assuming the third cut to be of a light weight classification, weight detector WD will actuate weight classification apparatus WCA and back contact *e* of relay A1TR will close the pickup circuit for relay R1 which in turn energizes relay RL1 to reflect the light weight classification. The closing of the back point of contact *d* of relay A1TR supplies energy from terminal B of the battery to terminal 1 of panel 1P, and the closing of front contact *a* of relay RL1 supplies energy from terminal B of the battery to terminal 5 of panel 1P.

The energy supplied to terminal 1 of panel 1P flows over the previously described circuit including front contact *e* of relay 1H (panel 1P containing storages for one of the previous cuts), terminal 22 of panel 1P, terminal 1 of panel 2P, front contact *e* of relay 2H (panel 2P containing storages for the other of the previous cuts), terminal 22 of panel 2P, and through the control winding of weight transfer relay WTR to battery terminal N. Relay WTR is thus energized and closes its front contacts.

The energy supplied to terminal 5 of panel 1P flows over the previously described circuit including terminal 26 of panel 1P, terminal 5 of panel 2P, terminal 26 of panel 2P, and front contacts *b* and *a* of relay WTR, to terminals 33 and 34, respectively of panel 2P and thence over the previously traced circuits to conductors 207 and 208, respectively, and terminals 12 and 13, respectively, of panel 1P. The supplying of energy to terminals 12 and 13 of panel 1P reflects the binary code character 011 for a light weight classification, conductor 206 and terminal 11 having no energy supplied thereto at this time. The energy thus supplied to terminals 12 and 13 of panel 1P flows from said terminals to the circuit networks CN (FIG. 3) and is transferred, as the cut progresses through the yard and as set forth in detail in the previously mentioned copending application, by said networks to relays E2TAC and E3TAC which become picked up to reflect the binary character 011 for a light weight cut classification. Relay LPR is energized at this time by a circuit extending from terminal B of the battery over the front point of contact *f* of relay E3TAC, the front point of contact *f* of relay E2TAC, the back point of contact *g* of relay E1TAC and the winding of relay LPR to battery terminal N. The pickup circuit for relay HPR is open at this time at the open front contact *c* of relay E1TAC. The picking up of relay LPR only actuates the previously described light weight reflection circuit, including the back point of contact *a* of relay HPR and front contact *b* of relay LPR, to the weight responsive apparatus.

If the third cut is of a heavy weight classification, weight detector WD and the weight classification apparatus will, in conjunction with track relay A1TR, operate to energize relay RH1 (FIG. 1) to reflect the heavy weight classification. Relay A1TR operates, in the manner previously described for the third cut, to energize weight transfer relay WTR and the closing of front contact *a* of relay RH1 supplies energy to terminal 6 of panel 1P at this time. The energy supplied to said terminal 6 flows to terminal 27 of panel 1P, terminal 6 of panel 2P, terminal 27 of panel 2P, over front contact *c* of relay WTR, terminal 32 of panel 2P, terminal 11 of panel 2P, terminal 32 of panel 1P, conductor 206, terminal 11 of panel 1P, and to the circuit networks CN. As the third cut now progresses into the yard, the circuit networks CN transfer the energy to relay E1TAC which alone picks up to reflect the binary code character 100 representing a heavy weight classification for the cut. The circuit for energizing heavy weight repeater relay HPR extends at this time from battery terminal B over front contact *f* of relay E1TAC, the back point of contact *d* of relay E2TAC, the back point of contact *c* of relay E3TAC and the winding of relay HPR to battery terminal N. The picking up of relay HPR only reflects a heavy weight classification to the weight responsive apparatus over the circuit previously described for such a classification, that is, the circuit including the front point of contact *a* of relay HPR and the back point of contact *a* of relay LPR.

Assuming that the third cut is of a medium weight classification, energy is supplied to both terminals 5 and 6 of panel 1P over the previously described circuits to those terminals and this energy is relayed over front contacts *a*, *b* and *c* of relay WTR to terminals 32, 33 and 34 of panel 2P, and conductors 206, 207 and 208 and terminals 11, 12 and 13 of panel 1P to establish the binary code character 111 representing a cut of a medium weight classification. From said terminals 11, 12 and 13 the energy is supplied to the circuit networks CN which in turn transfer the energy to relays E1TAC, E2TAC and E3TAC and energize all three of these relays to reflect binary code character 111 and, thus, the medium weight classification of the cut. The circuit for energizing heavy weight repeater relay HPR extends at this time from battery terminal B over front contact *c* of relay E1TAC, the front point of contact *c* of relay E2TAC, the front point of contact *c* of relay E3TAC and the winding of relay HPR to battery terminal N. The circuit for energizing relay LPR extends from terminal B of the battery over the front point of contact *d* of relay E3TAC, the front point of contact *e* of relay E2TAC, the front point of contact *g* of relay E1TAC, and the winding of relay LPR to battery terminal N. The circuit to the weight responsive apparatus, at this time, includes in series the front points of contacts *a* of relays HPR and LPR.

By the above description it is readily apparent that, by providing a group of binary code characters consisting of a greater quantity of code characters than are required for identification of the storage panels normally required in a classification yard, each distinct code character over and above the quantity necessary for identification of the storage panels can be employed for transmitting along with a cut of cars for which no storage panel is available, an item of information associated with the cut and required for control of the cut as it proceeds through the yard.

Although we have herein shown and described only one form of apparatus embodying our invention, it will be understood that various changes and modifications may be made therein within the scope of the appended claims, without departing from the spirit and scope of our invention.

Having thus described our invention, what we claim is:

1. In an information handling system comprising a plurality of storage panels in which items of information are stored until required for controlling apparatus associated with a selected circuit point in a transfer circuit network, each panel being identifiable by one of a plurality of distinct binary code characters greater in number than the number of said panels, each code character being transferred over said circuit network to said circuit point for identifying the panel containing the item of information required at that point; the combination comprising, (a) means providing a plurality of additional items of information each representing an apparatus control to be performed at said circuit point, (b) means responsive to the full storage condition of all of said panels for establishing for each said additional item of information another one of said distinct binary code characters and for supplying each such other binary code character to said circuit network for transfer to said circuit point, (c) means at said circuit point for interpreting each said other binary code character to obtain the item of information representing the apparatus control to be performed at that circuit point.

2. In an information handling system in which each of a plurality of storage panels is selected for storing a different group of information, each panel being identifiable by a distinct one of a group of binary numbers which are individually transferred over circuit networks to a circuit point where each said number is employed to identify its respective panel for reading out selected items of information for controlling apparatus associated with said circuit point; the combination comprising, (a) means for providing a plurality of additional items of information each representing a selected apparatus control to be performed at said circuit point, (b) means responsive to the full storage condition of all of said panels for establishing for each said additional item of information another distinct one of said group of binary numbers and for supplying each such other number to said circuit networks for transfer to said circuit point, (c) means at said circuit point for interpreting said other distinct numbers to obtain the items of information representing the selected apparatus controls to be performed at that circuit point.

3. In combination, (a) a plurality of groups of information items, (b) a plurality of information storage panels, (c) means for storing in each panel a different one of said groups of information items, (d) means for establishing as identification of each panel a distinct one of a group of binary code characters, (e) means responsive to the full storage condition of all of said panels for translating each of selected items of another group of information items into another distinct one of said group of binary code characters, (f) circuit network means for individually transferring each said code character to at least one circuit point at which said items of information are to be employed, (g) means controlled by said circuit transfer means at said circuit point for interpreting each said code character and, according as each code character identifies a panel or represents an item of information, for reselecting said panel or retranslating said code character into the item of information it represents.

4. In an information handling system for storing and transferring items of information for control of a series of objects moving over various routes, the combination comprising, (a) a plurality of information storage panels each at times available for storing items of information pertaining to one of said objects and each assigned for identification thereof a distinct one of a group of binary code characters, (b) means for storing the items of information pertaining to each of said series of objects in a different one of said panels until all of the panels contain storages, (c) circuit networks coresponding to said routes, (d) means responsive to said storing means for transferring to said circuit networks each binary code character identifying a panel containing a storage, (e) means controlled by said storing means for establishing, when all of said panels contain storages, another distinct binary code character for each of selected items of information pertaining to each object for which a panel is unavailable and for transferring to said circuit networks each such other code character, (f) means controlled by each object moving over its respective one of said routes for transferring over the corresponding circuit network the code character associated with that object, (g) means at a circuit point in said networks corresponding to a preselected location along said routes and controlled by the panel identifying code character for reading out from each panel identified by a code character items of information required at said circuit point for controlling apparatus at the coresponding route location, (1) said last means further controlled by said other code characters for retranslating each such other code character into its respective item of information required at said circuit point for controlling apparatus at the corresponding route location.

5. In an information handling system including a plurality of storage panels each at times available for storing information for control of each of a series of objects moving over various routes, each panel being assigned a distinct one of a group of binary code characters for identification of the respective panel, each code character being transferred to circuit networks corresponding to said routes; the combination comprising, (a) means controlled by said storage panels for translating each of selected items of information pertaining to each object for which a panel is unavailable into another distinct one of said group of binary code characters and for transferring each such other code character to said circuit networks, (b) means controlled by said objects moving over their respective routes for transferring over the corresponding circuit networks the code characters associated with said objects, (c) means at a circuit point in said networks corresponding to a preselected location along said routes and controlled by said code characters for reading out items of information from the panels identified by the code characters or for retranslating the code characters into their respective items of information according as the code characters are panel identification characters or said other characters, (d) means responsive to such items of information for controlling said objects at said preselected location along said routes.

6. An information handling system for information pertaining to cuts of cars entering a railway car classification yard, comprising in combination, (a) a plurality of storage panels, (b) means for selecting a vacant one of the panels for each cut entering the yard and storing therein an item of information pertaining to the cut, (c) means for establishing a distinct one of a group of binary code characters for each selected panel and for associating each code character with the cut of cars associated with the selected panel, (d) means for establishing another distinct one of said group of code characters for each of selected items of information for cuts of cars entering the yard when all of said storage panels are full and for associating each said other code character with its respective cut, (e) circuit network means for transferring each code character as the associated cut proceeds through the yard towards a preselected storage track, (f) means within said network responsive to the arrival of each cut at a preselected location in the yard for interpreting the transferred code character and identifying the panel selected for the cut or recording the item of information, (g) means responsive to each interpretation of a code character identifying a panel for reading out from that panel the item of information pertaining to the cut of cars associated with the identified panel, (h) circuit means at said location responsive to each said item of information for controlling the associated cut.

7. In an information handling system in which each of a plurality of information storage panels is assigned a distinct one of a group of binary code characters, each said code character being transferred by transfer means over circuit networks to a circuit point where each panel is identified by its respective code character and the information stored in the identified panel is read out for controlling apparatus associated with said circuit point, the combination comprising, (a) means responsive to the full storage condition of all of said panels for establishing another distinct one of said group of binary code characters for each additional item of information to be transferred to said circuit point for apparatus control, (b) means controlled by the first mentioned transfer means for transferring said other distinct code characters to said circuit point, (c) means responsive to the arrival of said other distinct code characters at said circuit point for deriving the item of information represented by each such code character, (d) means controlled by each such item of information for controlling selected apparatus associated with said point.

8. In an information handling system in which each of a plurality of storage panels is employed for storing at least one of a plurality of items of information until required at preselected circuit points in circuit networks, each said panel being assigned a distinct one of a group of binary code characters which are transferred over said circuit networks to said circuit points and which are employed at said circuit points for identifying the respective panels and reading out the items of information stored therein, the combination comprising, (a) means for establishing an additional one of said group of binary code characters for each of said plurality of items of information for which a storage panel is unavailable, (b) means for transferring each said additional code character over said circuit networks, (c) means at a selected one of said circuit points for translating each said additional binary code character into its respective item of information.

9. A system for handling items of information pertaining to cuts of cars entering a railway car classification yard, said system comprising in combination, (a) a plurality of storage panels, (b) means for selecting a vacant one of the panels for each cut entering the yard and storing therein items of information pertaining to the cut, (c) means for deriving a distinct binary code character identifying each selected panel and for associating each code character with the cut of cars associated with the respective selected panel, (d) means for deriving an additional distinct binary code character representing an item of information for each cut of cars for which a storage panel is unavailable, (e) means for transferring each code character to successive circuit points in a circuit network in accordance with the progress of the associated cut of cars through the yard to a predetermined storage track, (f) means at a preselected one of said circuit points for interpreting each said code charcater, (g) means responsive to the interpreting means for translating each said additional code character into the item of information represented by that character, (h) means responsive to the interpreting means for reading out from a panel identified by each of the other code characters an item of information pertaining to the cut of cars associated with the identified panel.

References Cited by the Examiner
UNITED STATES PATENTS
2,740,106    3/56    Phelps ___________ 340—163 X LEO QUACKENBUSH, *Primary Examiner.*
STEPHEN W. CAPELLI, *Examiner.*